March 29, 1966 G. WINTRISS 3,242,533
SAFETY CONTROL FOR HYDRAULIC MOLD MACHINE
WITH LOW PRESSURE CLOSING
Filed April 16, 1964
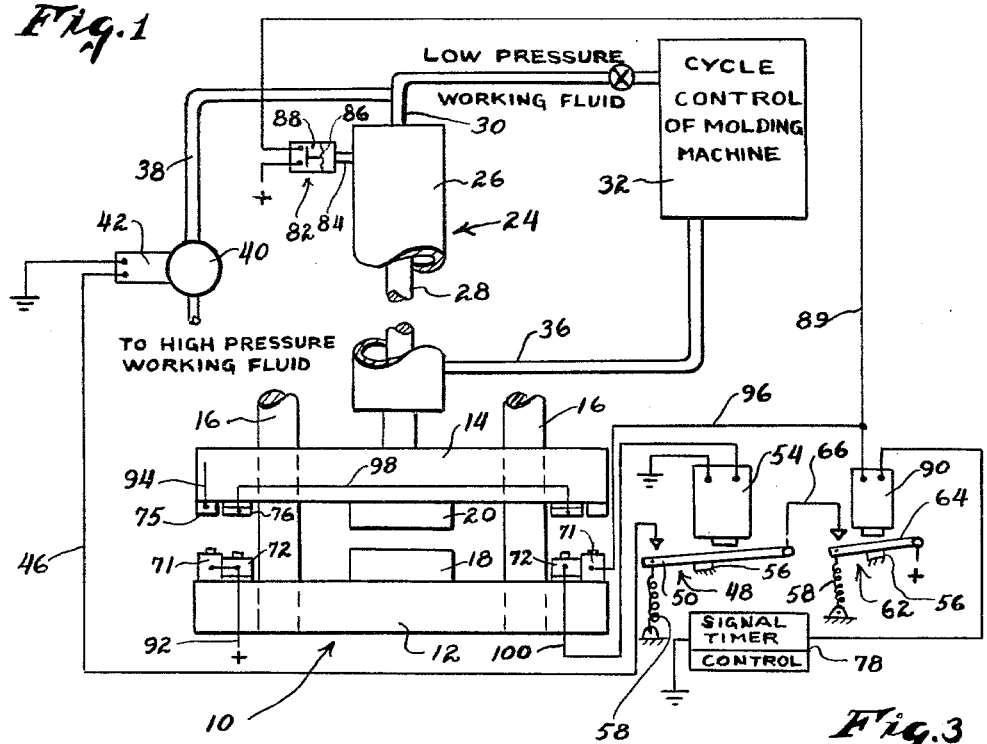
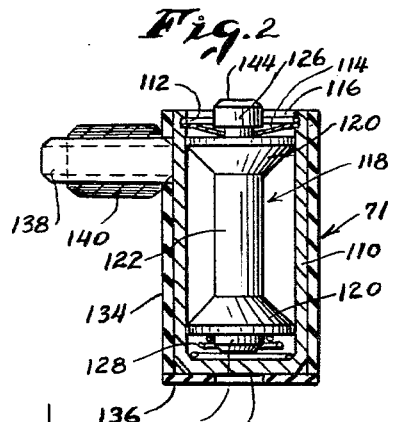
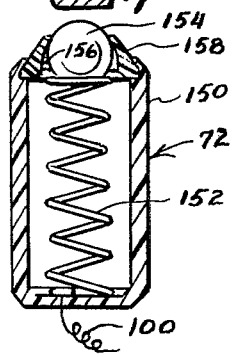
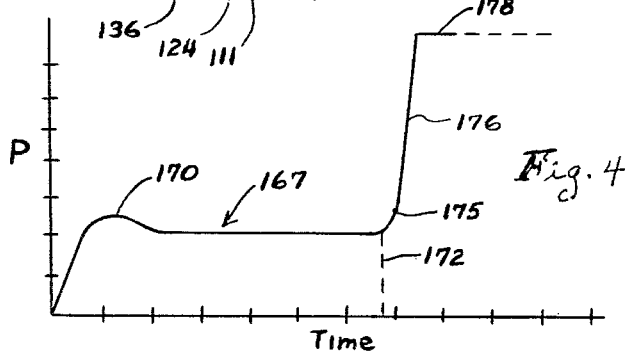
INVENTOR.
George Wintriss
BY Emery, Whittemore,
Sandoe & Graham
ATTORNEYS

United States Patent Office 3,242,533
Patented Mar. 29, 1966

3,242,533
SAFETY CONTROL FOR HYDRAULIC MOLD
MACHINE WITH LOW PRESSURE CLOSING
George Wintriss, Carversville, Pa.
Continuation of application Ser. No. 40,912, July 5, 1960.
This application Apr. 16, 1964, Ser. No. 360,384
The portion of the term of the patent subsequent to
Feb. 26, 1980, has been disclaimed
6 Claims. (Cl. 18—16)

This application is a continuation of my copending application Serial No. 40,912, filed July 5, 1960, now abandoned.

This invention relates to control means for molding machines and other equipment in which a hydraulic motor moves a platen to open and close a mold or die. The invention is more particularly concerned with the type of machine in which the platen is brought to closed position by low-pressure working fluid, and when the die is in closed position, high-pressure working fluid is supplied to the hydraulic motor to produce the high pressure necessary for the work performed by the machine.

It is an object of the invention to provide improved control means for applying high pressure only when the die fully closes and there is no obstruction to prevent an even complete closing of the die. The invention thereby prevents breakage of the die or other damage such as occurs when high pressure is applied to a die which can not fully close.

The invention includes position-sensing devices on the die for determining when the die is closed and high pressure can be safely applied. There are a plurality of position-sensing devices on different parts of the die. They may be at diagonally-opposite locations, or at four corners of a die for insuring that the die is closed evenly and not high on one side though closed at the other.

The term "die" is used herein to include the actual structure of the die, and the part of the machine immediately adjacent to the die and which is of integral construction therewith.

Other objects, features and advantages of the invention will appear or be pointed out as the description proceeds.

In the drawing, forming a part hereof, in which like reference characters indicate corresponding part in all the views:

FIGURE 1 is a diagrammatic view and wiring diagram for a machine equipped with the control means of this invention;

FIGURES 2 and 3 are sectional views showing different kinds of contacts or switch elements for sensing the position of the die; and FIGURE 4 is a chart showing the way in which high pressure is applied when the die reaches its closed position.

FIGURE 1 shows a molding machine 10 having a fixed platen 12 and a movable platen 14 that travels toward and from the fixed platen along guides 16. The machine includes a fixed die part 18 and a movable die part 20.

These die parts 18 and 20 are integrally connected with the platens 12 and 14, respectively, and for purposes of this invention the platen 12 and die part 18 are to be considered a "fixed" die and the die part 20 and platen 14 are to be considered a "movable" die.

The apparatus includes a hydraulic motor 24 having a cylinder 26 and a piston rod 28 operatively connected to the platen 14. This may be a direct connection or it may be through linkage, both constructions being well understood in the art.

A conduit 30 is connected to the head end of the cylinder 26. Low pressure working fluid flows through the conduit 30 to the cylinder 26 from a controller 32 which includes valves and valve control means for supplying working fluid to the conduit 30, and also to another conduit 36 which connects with the crank end of the cylinder 26. It will be understood that the conduits 30 and 36 serve alternately as supply conduits during part of the cycle and as exhaust conduits during other parts of the cycle.

For supplying high-pressure fluid, there is a conduit 38 which communicates with the conduit 30 and which is commanded by a valve 40 operated by an electro-magnetic actuator 42. The conduit 38 leads to a source of high-pressure working fluid which is supplied to the conduit when the actuator 42 is energized to open the valve 40. This valve 40 has a bis toward closed position and returns to such position whether the supply of power to the actuator 42 is shut off.

Power is supplied to the actuator 42 through a conductor 46 leading to a fixed contact of a relay switch 48. An armature 50, of the relay switch 48, is moved into position, to close the circuit of a conductor 46, by a coil 54 of the relay switch 48. When the coil 54 is not energized, the armature 50 is held against a fixed stop 56 by a spring 58.

Current is supplied to the armature of the relay switch 48 from another relay switch 62, including an armature 64 that moves into position to touch a fixed contact at the end of a conductor 66 leading to the armature 50 of the other relay switch 48. This relay switch 62, like the relay switch 48, has a bias toward open position with a stop 56 and a spring 58.

When both of the relay switches 48 and 62 are energized, power is supplied to the actuator 42 for the valve 40. Since the armatures of the relay switches 48 and 62 are in series, no power can reach the actuator 42 unless both of the relay switches 48 and 62 are closed at the same time.

There are positions sensors on the dies of the molding machine. In the construction illustrated, there are two sensors 71 attached to the fixed platen 12; and there are two other position sensors 72, also attached to the fixed platen 12.

The position sensors include also movable contacts 75 and 76 integrally secured to the platen 14 in position to co-operate with the position sensors 71 and 72, respectively.

As the platen 14 moves into closed position, the contacts 75 on the platen 14 touch the position sensors 71. This contact occurs just before the die is closed. The contacts 76 are in position to touch the position sensors 72 when the die is fully closed, or substantially closed.

The invention can be used with the position sensors 71 only, in combination with a timer control 78, the operation of which will be explained. The invention can also be used with the position sensors 72 only, but a more complete control is obtained by having the combinations of pressure sensors as illustrated.

The illustrated control apparatus also includes a pressure sensor 82 communicating with the interior of the cylinder 26, at the head end of the cylinder, by a conduit 84. This pressure sensor 82 includes a diaphragm 86 which closes a switch 88 when the pressure in the cylinder 26 exceeds a pre-selected maximum. The pressure sensor 82 is illustrated diagrammatically and is merely representative of normally-open switches that are pressure-actuated.

The switch 88 is connected, through a conductor 89, with a coil 90 of the relay switch 62. When the low pressure in the cylinder 42 begins to rise as the result of the die encountering resistance as it reaches closed position, the switch 88 is closed and power supplied to the coil 90 of the relay switch 62. This coil 90 is grounded through the timer 78 which is set to open the circuit of the coil 90 after a short interval of time. This interval is selected so as to make it longer than the time required for the machine to complete the closing of the die in normal operation; but only slightly longer so that if any delay is encountered in the closing of the die, the relay switch 62 will open and high pressure will not be applied.

The relay switch 62 is also operated by the position sensors 71. The circuit by which these position sensors supply power to the coil 90 of the relay switch 62 includes a conductor 92 leading from a power source to the left-hand position sensor 71. When the platen is in position to make the contact 75 touch the position sensor 71, the circuit continues through this contact 75 and through a conductor 94 to the contact 75 on the right-hand side of the platen 14. With this right-hand contact 75 touching the right-hand position sensor 71, the circuit is completed to a conductor 96 which leads to the coil 90 of the relay switch 62.

The other position sensors 72 supply power to energize the coil 54 of the relay switch 48. This circuit extends through the conductor 92, left-hand position sensor 72, left-hand contact 76, conductor 96, right-hand contact 76, right-hand position sensor 72, to a conductor 100 which leads to the coil 54.

In the operation of the machine, the relay switch 62 is closed first by the switch 88 of the pressure sensor or by contact of the position sensors 71 with their associated contacts 75, whichever occurs first, as the molding machine closes. If the closing of the machine is not completed within the time allowance provided by the timer 78, the ground circuit for the coil 20 is broken and the relay switch 62 opens. Subsequent operation of the relay switch 48 has no effect, since it receives its power through the first relay switch 62.

In the normal operation of the machine, however, the die moves into closed position and establishes the circuit through the position sensors 72 and their associated switches 76 to energize the coil 54 of the relay switch 48 and thus supply current to the actuator of the high pressure valve 40 before the timer 78 opens the circuit. This energizing of the actuator 42 causes high-pressure working fluid to be supplied to the cylinder 26, as previously explained. This pressure is maintained, even though the valve 40 closes, until pressure is exhausted from the cylinder 26 through the conduit 30 leading to the controller 32. If desired, the valve 40 can be held open by having the closing of the relay switch 48 establish a holding circuit for the relay switch 62.

FIGURES 2 and 3 show two different constructions that can be used for the position sensors 71 and 72. In the construction illustrated, the position sensor shown in FIGURE 2 is used as the position sensor 71 of the diagrammatic view; and the position sensor of FIGURE 2 is used as the position sensor 72 in the diagrammatic view. The position sensor 71 is a self-leveling switch including a cylinder 110 of uniform diameter and closed at its lower end by a bottom wall 111. Near the upper end of the cylinder 110 there is an annular recess 112. A diaphragm 114 has its peripheral edge located in the recess 112; and there is a snap ring 116 in the recess 112 for holding the circumferential edge of the diaphragm 114 securely in the recess 112.

A piston element 118 is located within the cylinder 110. This piston element 118 has heads 120 at its upper and lower ends, the heads being connected by a stem 122. A stud 124 projects from the bottom of the lower head 120, and a piston rod 126 extends from the upper head 120, through an opening in the diaphragm 114 and to a level which is preferably slightly higher than the upper end of the cylinder 110.

There is a conical coil spring 128 in the lower end of the cylinder 110 below the lower head 120 of the piston element 118. At its upper end, the spring 128 is of a diameter to fit around the stud 124; and at its lower end, the spring 128 is of a diameter to fit within the bore of the cylinder 110. This is a particularly efficient form of spring for urging the piston element 118 upwardly in the cylinder; but it will be understood that the spring 128, in the broader aspects of the invention, is merely representative of means for giving the piston element 118 a bias toward the upper end of the cylinder.

When the spring 128 is fully expanded, the position of the piston element 118 is preferably somewhat below the annular recess 112 so as not to impose any load on the diaphragm 124 tending to push the diaphragm out of the upper end of the cylinder.

The diaphragm 114 is preferably made of a thin and pliable plastic sheet material. It has a center hole which surrounds the piston rod 126, and the purpose of the diaphragm 114 is to prevent leakage of liquid from the cylinder 110. The cylinder 110, below the diaphragm 114, is filled with liquid. Different kinds of liquids can be used and the rate of operation of the switch depends partly upon the viscosity of the liquid. The most important characteristic of the liquid is that it should be inert to the metal or other materials of which the parts are made, and it should also be inert to the material of the diaphragm 114.

The cylinder 110 is surrounded by a sleeve 134 made of electrical insulating material. There is a washer 136 at the lower end of the sleeve 134 extending under most of the area of the end wall 111, and this washer 136 is also made of electrical insulating material. A terminal post 138 extends from the cylinder 110 through the insulating sleeve 134 and a portion of this terminal post 138, which is closest to the sleeve 134, is insulated by a sleeve 140. The outer end of the post 138 is exposed for receiving a clip or other connector for joining the post with other parts of an electric circuit.

The cylinder 110, a piston element 118 and springs 128 are preferably made of electrical conducting material so that there is a closed circuit from the top face of the piston rod 126 to the exposed end of the terminal post 138. This circuit can be obtained in other ways as by connecting a by-pass conductor from the piston rod 126 to the terminal post 138, but the construction illustrated is more rugged.

The top face of the piston rod 126 is indicated by the reference character 144 and this top face constitutes the self-leveling contact of the position sensor. This face touches the contact 75 when the platen 14 moves downwardly. It will be understood that terms of orientation, such as "up" and "down," are relative.

When the position sensor of FIGURE 2 is used, it is positioned so that when the die closes, the contact 75 thrusts the piston element 118 downwardly in the cylinder 110 for a few thousandths of an inch to put the spring under some compression. When the movable contact 75 moves away from the contact 144, as the die opens, the contact 144 rises very slowly; but it is pushed downwardly again with the next cycle of operation of the molding machine.

The rate at which the piston element 118 rises in the cylinder 110 depends principally upon how closely the heads 120 fit the bore of the cylinder, and upon the viscosity of the liquid. The rate of rise can be made very slow so that the contact 144 does not rise to its original position before the next cycle of operation.

FIGURE 3 shows the position sensor 72. This sensor includes a cylinder 150 containing a helical spring 152 compressed between the bottom of the cylinder 150 and a ball contact 154. This ball contact fits into a converging opening 156 in a cap 158 attached to the upper end of the cylinder 150. The cylinder 150 and the cap 158 are preferably made of plastic or other electrical insulating material. The conductor 100 extends through the bottom of the cylinder 150 and is secured to the spring 152. On the other side of the machine, the conductor 90 connects with this spring in the same manner as the conductor 100. The ball contact 154 is pressed downward by the contact 76 to complete the circuit.

FIGURE 4 shows the operation of the machine. Time in the cycle is measured along the abscissa of the chart and pressure of the working fluid along the ordinate. The pressure in the cylinder is represented by the line 167. This pressure increases as the low pressure working fluid is initially supplied to the cylinder and rises to a value indicated at the point 170. This peak of pressure corresponds to the acceleration load of the parts and is influenced greatly by the type of motion-transmitting connections between the hydraulic cylinder and the movable platen. If the connection is direct, there is very little peak at the point 170, whereas on machines having motion-transmitting linkages, the pressure peak is higher. The low pressure fluid moves the platen toward closed position until the moving of the die parts together begins to offer some resistance at the time indicated by the line 172. This causes some rise in the working fluid pressure because of the increased resistance to movement of the parts; but the low-pressure fluid, even if it builds up to its full source pressure, is insufficient to hold the die closed with the pressure necessary for operating the machine, and the low pressure is insufficient to damage the die or other parts in the event that an obstruction prevents closing of the die. At a time indicated by the point 175 on the chart, the die is closed, or substantially so, and the control mechanism of FIGURE 1 supplies high pressure fluid to the hydraulic motor, causing a rapid rise in the pressure in the cylinder, as indicated by the ascending portion 176 of the line on the chart. The maximum pressure, represented by the line 178, is maintained in the hydraulic cylinder during the critical part of the cycle, and then the pressure is relieved and the working fluid exhausted in accordance with conventional practice and by operation of the controller 32, shown diagrammatically in FIGURE 1.

The preferred embodiment of the invention has been illustrated and described, but changes and modifications can be made and some features can be used in different combinations without departing from the invention as defined in the claims.

What is claimed is:

1. In a machine of the class wherein a movable die part is moved toward and from a relatively fixed die part to close and open a die by a motor, and wherein the final movement of the movable die part is controlled by safety control means that are independent of the speed of the movable die part toward substantially closed position, the combination with the die parts of
   (a) first fluid means for supplying working fluid to the motor at low pressure to operate the movable die between open and closed positions, cycle control apparatus for controlling said first fluid supply means,
   (b) second fluid supply means for supplying working fluid to the motor at high pressure,
   (c) a first electric circuit having contacts operably connected with the die parts and one of which moves with a die part to bring the contacts together and to close the first circuit when the die parts move into substantially closed position,
   (d) a second electric circuit including contacts connected with the die parts similarly to the contacts of the first electric circuit but in positions to touch one another initially and to close the second electric circuit only after the dies are closer together than when the contacts of the first circuit touched one another,
   (e) the safety control means being operably connected with both the first and second electric circuits so as to require that both circuits be closed at the same time as a prerequisite to the final closing of the dies under pressure,
   (f) the safety control means including a timer means for starting operation of the timer when the movable die part moves into substantially closed position with respect to the relatively fixed die part, and a control circuit responsive to the operation of the timer for preventing the application of final closing pressure to the motor when the time between the closing of the first and second electric circuits exceeds a period determined by the timer.

2. The machine described in claim 1, characterized by a plurality of similar position sensors on different sides of the mold and connected in series in said circuit whereby the mold must close evenly on its different sides in order to have the contacts close the circuit so that working fluid at higher pressure can be supplied to the motor.

3. The machine described in claim 1 characterized by electrical contacts connected with the die parts along a diagonal through opposite corners of a die.

4. The machine described in claim 3, characterized by similar electrical contacts adjacent to all four corners of a die.

5. The machine described in claim 1 characterized by the timer being started by closing of the first electric circuit and being connected in the circuit and operable to open the second electric circuit to render the contacts thereof ineffective to cause supply of high pressure fluid to the motor when the contacts of the second circuit close after a period of operation of the timer.

6. The machine described in claim 1 characterized by
   (a) the safety control means including also a pressure-responsive means actuated by a rise in the pressure of the working fluid supplied to the motor as the die parts reach substantially closed position,
   (b) the means for supplying the higher pressure fluid being controlled by said safety control means,
   (c) a timer limiting the period of operation of said safety control means,
   (d) the timer being operably connected with the pressure-responsive means and started by the rise in pressure in said pressure-responsive means as the die parts reach substantially closed position.

References Cited by the Examiner

UNITED STATES PATENTS

| | | | |
|---|---|---|---|
| 2,381,125 | 8/1945 | Hermann | 18—16 |
| 2,801,442 | 8/1957 | Moslo | 18—16 |
| 2,923,973 | 2/1960 | Ninneman | 18—16 |
| 3,078,515 | 2/1963 | Wintress | 18—16 |

J. SPENCER OVERHOLSER, *Primary Examiner.*

WILLIAM J. STEPHENSON, *Examiner.*